Nov. 22, 1966 R. D. BARRETT ETAL 3,286,795
SELF-ADJUSTING HYDRAULIC DISK BRAKES
Filed April 7, 1965

Inventors:
Robert D. Barrett
Kazys Raciunas
By Melburn E. Laundry
Atty.

United States Patent Office 3,286,795
Patented Nov. 22, 1966

1

3,286,795
SELF-ADJUSTING HYDRAULIC DISK BRAKES
Robert D. Barrett, Westchester, and Kazys Raciunas, Cicero, Ill., assignors to International Harvester Company, Chicago, Ill., a corporation of Delaware
Filed Apr. 7, 1965, Ser. No. 446,328
16 Claims. (Cl. 188—72)

This invention relates to a hydraulic disk brake and more particularly to a disk brake having novel self adjusting means to compensate automatically for wear.

One of the objects of the invention is to provide an improved hydraulic disk brake.

Another object of the invention is to provide a disk brake having improved self adjusting means to compensate for wear of frictionally engageable disk components of the brake.

A further object of the invention is to provide an automatically self adjusting disk brake having wear compensating means to maintain a running brake clearance within prescribed closely controlled limits.

Still another object of the invention is to provide a disk brake having automatically self adjusting deformable means to continuously resist engagement of the brakes with a predetermined resistance and to take a permanent shortening set exactly corresponding to wear of the brake disks.

These and other objects of the invention will become apparent from the following description taken in conjunction with the accompanying drawing, in which.

Figure 1:
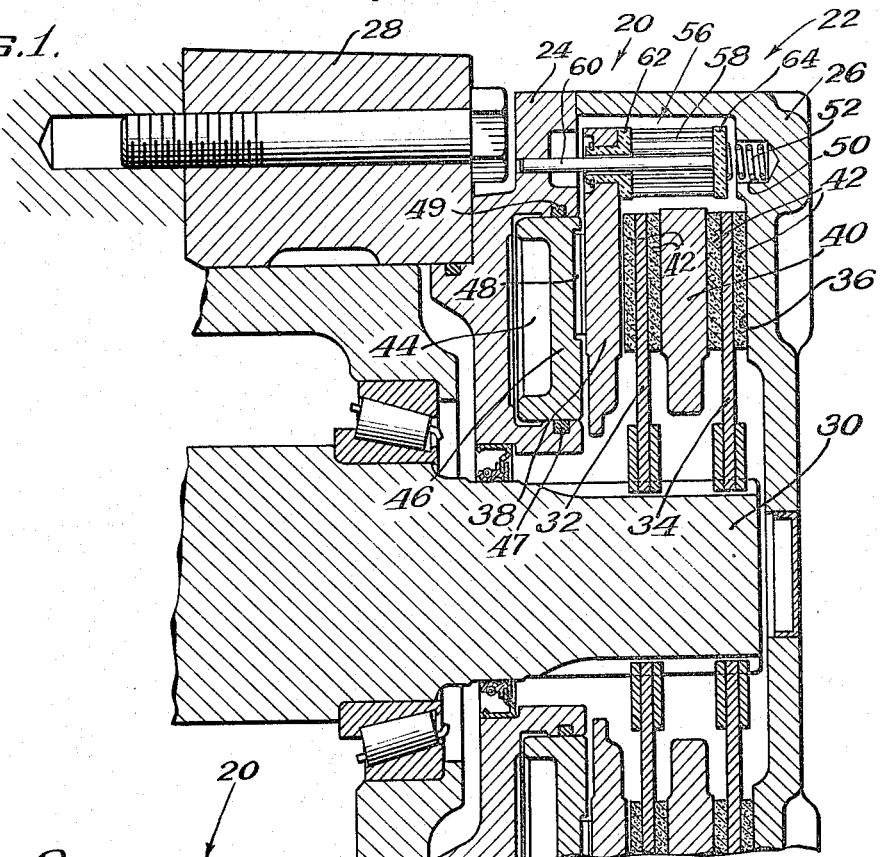
FIG. 1 is a fragmentary elevational view in section of a hydraulically operated disk brake embodying the principles of the invention.

Referring now in greater detail to the drawing, FIG. 1 shows a disk brake designated generally by the numeral 20 and including a brake housing comprising a first or piston housing member 24 and an abutting second or brake housing member 26 secured thereto, the members 24, 26 being conventionally mounted to the rear axle housing 28 of an associated vehicle, not shown, about a rotatable axle 30 to be braked. The disk brake 20 includes a plurality of alternately interleaved, coaxially arranged, axially shiftable rotor and stator disks including first and second rotor friction disks 32, 34 a first stator disk 38 functioning as an actuator disk and a second stator disk 40. The housing member 26 has a radially extending flat annular inner surface or end plate 36 integral therewith facing housing member 24 and acting as a back up plate for the rotor and stator disks, the second rotor disk 34 being positioned immediately adjacent surface 36. The rotor friction disks 32, 34 each have linings 42 of friction material on both sides and are splined to the axle 30 for rotation therewith and axial movement therealong. The stator disks 38, 40 are mounted for axial movement with respect to the axle 30 and are secured conventionally against rotation by pins, not shown, extending through the housing.

The piston housing member 24 has fluid chambers 44 therein with actuating means comprising hydraulically actuatable brake pistons 46 positioned within the chambers for movement axially into contact with the actuator disk 38 positioned adjacent piston housing 24 between the brake pistons 44 and the first rotor disk 32. An annular pad 48 of heat insulative material is positioned con-

2 ventionally between actuator disk 38 and the brake pistons 46 which are suitably connected by means, not shown, to an associated vehicle brake pedal, not shown, to operate the brakes resulting in a braking of the axle 30.

Figure 2:
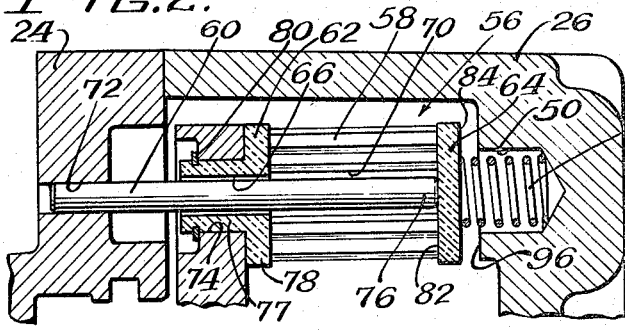
FIGS. 2 and 3 are sectional views on an enlarged scale of a portion of the disk brake of FIG. 1 with the adjusting means of the invention shown in two different positions.

With the brake in a released or nonoperative position as illustrated in FIGS. 1 and 2, and axially extending annular space or running clearance between the interleaved stator and rotor disks is maintained within closely controlled limits of, for instance, about .020 to .030 inch total axial clearance between disks 38, 32, 40, 34 and end plate 36. Upon actuation of the brakes by introduction of fluid under high pressure from a suitable source of fluid under pressure, not shown, into fluid chambers 44, the brake pistons 46 move axially outwardly to the right, as viewed in the figures, toward the end plate 36, the pistons 46 moving actuator disk 38 to the right which effects frictional engagement of it and adjacent surfaces of the interleaved stator and rotor disks and surface 36 of housing member 26. Circumferentially spaced axially extending housing openings 50 are provided in the brake housing member 26 and coil return springs 52 are positioned therein to return the actuator disk 38 a predetermined distance axially to the left, as viewed in the figures, upon disengagement of the brakes to secure a running clearance between the stator and rotor disks and the end plate. Conventionally, fluid under low pressure is maintained in fluid chambers 44 maintaining pistons 46 in contact with actuator disk 38 opposing the return action of the springs with a lesser force. Additionally, friction of elastomeric seals 47 and 49 about pistons 46 serve to maintain the pistons 46 in contact with disk 38.

To compensate continuously for brake disk wear and to maintain running clearances within predetermined levels without costly manual adjustment of the brakes or replacement of disk linings, a plurality of automatic adjusting means designated generally by the numeral 56 are provided.

Advantageously, two to four automatic adjusting means 56 are utilized spaced circumferentially and symmetrically about the axle 30 and extending axially between the brake housing members 24, 26 in line with the return springs 52. In a preferred embodiment of the invention two automatic adjusting means 56 are arranged at a 180° spacing, that is, one adjusting means 56 is arranged diametrically opposite to a second adjusting means in order to equalize return of the pistons and to secure an even or balanced disk adjustment. As should be clear, additional adjusting means 56 may be provided dependent on the particular application, the maximum permissible size of the adjusting means and other considerations, such additions and corresponding modifications being within the skill of the art. Since the adjusting means 56 are associated with the return springs, one such adjusting means is preferably, but not necessarily, provided for each return spring 52.

The automatic adjusting means 56 each include a uniformly deformable longitudinally extending adjuster member 58 mounted for movement axially along a stop rod 60 and sandwiched between first and second axially spaced heat insulators 62, 64. The insulators 62, 64 are tough relatively rigid members formed of a thermal insulating material such as molded asbestos composition or the like and are advantageously bonded to adjuster member 58 as by a structural type adhesive, such as epoxy cement or the like, for axial sliding movement of the insulators and member 58 as a unit along rod 60 with appropriate openings 66, 70 being provided respectively in insulator 62 and deformable member 58 for receipt of stop rod 60.

Piston housing member 24 and actuator disk 38 are provided with openings 72, 74 respectively which are coaxially aligned with spring 52 and housing opening 50 for receipt of adjusting means 56.

Stop rod 60 is secured fixedly to piston housing member 24 as by press fitting into opening 72, and extends in cantilevered fashion axially to the right as viewed in the drawing through actuator disk opening 74 supporting adjusting means 56 for limited movement axially toward and away from end plate 36. The rod 60 has a free end 76 which is axially spaced a predetermined distance from housing member 26 and is adapted to encounter insulator 64 with the brakes fully disengaged in a running position, as illustrated in FIG. 2 to limit axial movement of actuator disk 38 to a constant amount and to provide a running clearance between the brake disks equal to an axial spacing, FIG. 2, between insulator 64 and an adjacent flat surface 96 on the inner face of brake housing member 26 about opening 50.

Insulators 62, 64 insulate the adjuster member 58 from actuator disk 38 and housing member 26 to prevent the transfer of heat to member 58 during braking tending to alter its physical characteristics. The first insulator 62 is generally T-shaped in cross section and includes a leg portion 77 and a flange portion 78. The first insulator 62 is secured fixedly to actuator disk 38 for movement therewith, as by a snap ring 80 in a groove of insulator 62 on the left hand side of actuator disk 38 and by flange portion 78 abutting the right hand side of actuator disk 38, as viewed in the drawing. The second insulator 64 is generally flat having one side 82 thereof adjacent adjuster member 58 and a second side 84 adapted to come into contact with surface 96 of housing member 26. Spring 52 is adapted to bias the automatic adjusting means 56 to the left by spring pressure on insulator 64 moving insulator 64 against free end 76 of rod 60.

The adjuster member 58 is formed of a uniformly deformable, crushable material which is relatively nonresilient and which has a predetermined substantially uniform longitudinal crushing strength or crushing resistance, that is, having a predetermined resistance to crushing, and being subject to a longitudinal shortening upon subjection to forces beyond such crushing resistance. The member 58 is longitudinally extending and is generally rectangular in cross section, being formed of a plurality of longitudinally extending cells 86, FIG. 5, which are shaped in cross section and joined or bonded together along their sides to form a unit of uniformly deformable material. Each of the cells 86 has the property of failing at a relatively constant load with complete dissipation of energy which would otherwise be released in rebound. One material which has been found to be particularly well suited for use as a deformable member in the adjusting means of the present invention is an aluminum honeycomb material available from Hexcel Products, Inc., Berkeley, California, and formed as by bonding together corrugated sheets of aluminum.

Sufficient clearance is provided between the rod 60 and the openings 66, 70 in the insulator 62 and member 58 to ensure free sliding movement of the automatic adjusting means with respect to rod 60.

Figure 4:
FIGS. 4 and 5 are side elevational and front perspective views respectively on an enlarged scale, of a deformable member suitable for use as an element of the adjusting means illustrated in FIGS. 2 and 3.
Figure 3:
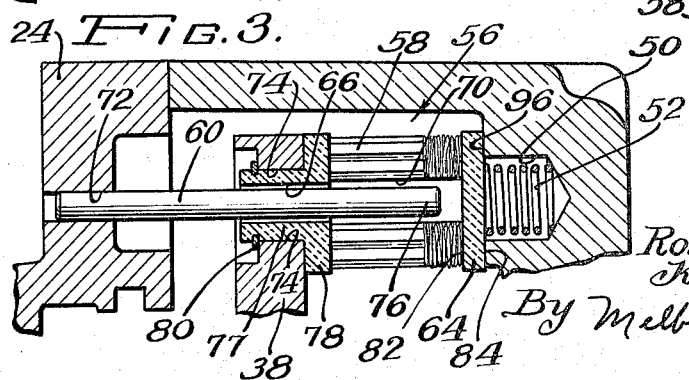
Figure 5:
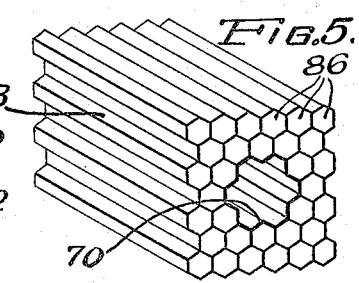

While the particular embodiment of the invention illustrated in FIGS. 4, 5 is generally rectangular in cross section, it should be clear that a similar member having a circular cross section forming a generally cylindrical member should perform equally acceptably. The member 58 has a predetermined initial length and the length of the member 58 in conjunction with insulator 64 and the width of flange 78 of insulator 62 is equal to the initial distance between actuator disk 38 and the flat surface 96 of housing member 26 with the brakes engaged as shown in FIG. 3. In the particular embodiment of the invention illustrated, the member 58 was selected to have a crushed length slightly less than the total possible wear of the brake linings so that the deformable member acts as a positive stop means to prevent frictional engagement of the disks before the friction linings are completely worn: The deformable member 58 is repeatedly crushed in engagement of the brakes until it becomes essentially a solid member incapable of additional axial crushing except upon application of a considerably increased brake pedal pressure, thus serving as a warning to an operator of the brakes that relining is required.

The coil return springs 52 each have a return strength relatively less than the crushing resistance of each of the deformable members 58 and are adapted to bear against insulator 64 biasing the adjusting means 56 and actuator disk 38 connected thereto to the left, biasing insulator 64 against stop rod 60 to provide a predetermined running clearance.

Referring now to FIG. 1, the operation of the automatic adjusting means of the invention may be seen more clearly. When it is desired to engage the brakes, pressure is applied on an associated brake pedal, not shown, causing brake fluid under pressure to enter fluid chamber 44 moving brake piston 46 and actuator disk 38 to the right causing frictional engagement of adjacent surfaces of the interleaved stator and rotor disks and housing surface 36 which causes braking of the rotor disks 32, 34 which are splined to the axle. With new or replaced linings of friction material on the rotor disks, movement of the actuator disk 38 to the right effects movement of the associated self adjusting means 56 to the right which in turn moves insulator 64 to the right away from the free end of rod 60 and against the flat surface 96 of housing member 26 forcing the coil spring 52 to the right within the opening 50. Initially with the brakes fully disengaged, as shown in FIG. 2, spring 52 biases insulator 64 against the end 76 of rod 60 to provide an axial spacing of about .020 to .030 inch between the insulator 64 and the adjacent surface 96 of brake housing member 26, and the force of the return spring 52 is insufficient to crush the deformable member 58. When pressure is applied to an associated brake pedal, not shown, to engage the brakes, the actuator disk 38 moves to the right moving the rotor and stator disks into frictional braking engagement with each other and with the flat surface 36, and moving the adjusting means into contact with the housing member 26. As the friction material lining the rotor disks wear continuously on engagement of the brake, adjusting means 56 continuously resists engagement of the disks and is simultaneously crushed in an amount exactly corresponding to the amount of wear of the friction linings. As should be clear, what occurs is that the deformable member 58 is not sufficiently strong to prevent frictional engagement of the disks and the deformable member 58 continuously takes a permanent shortening set, thus providing a disk brake which is continuously adjusting itself to maintain running clearances within closely controlled limits.

As the brakes are repeatedly applied, the friction linings 42 of the rotor disks continue to wear tending to increase the distance actuator disk 38 must move to obtain complete frictional engagement of the brake disks. The adjusting means 56 tends to prevent movement of the actuator disk to the right the means 56 coming into contact with the housing member 26 before complete engagement of the disks is obtained. Thus, the member 58 is repeatedly collapsed as the friction linings wear in an amount exactly corresponding to wear of the linings as suggested by FIG. 3 showing the brake in a fully engaged position with a plurality of crush marks shown at the right hand end of member 58. While the crush marks have been shown as occurring at the right hand end of member 58, it should be clear that the deformable member is crushed between two surfaces and axial crushing can occur at either the left or right hand end or at an intermediate location thereof. When pressure on the associated brake pedal is released, the return spring 52 presses against the adjusting means 56 moving the actuator plate 38 to the left and moving insulator 64 against the free end of rod 60 to provide a predetermined axial spacing, for instance, approximately .020 and .030 inch, between the insulator 64 and the flat surface 96 of housing member 26 to achieve a suitable amount of running clearance between disks.

Having now described the invention, its operation should be clear. Since modifications of the details of the structures as illustrated in the various figures are contemplated, the invention should be limited only by the scope of the appended claims.

What is claimed is:

1. In a vehicle having a supporting frame and a rotating axle to be braked, an automatically adjusting disk brake comprising: a housing including first and second housing members secured to said frame about said axle; a plurality of axially shiftable rotor and stator disks mounted about said axle within said housing in coaxial interleaved position; friction surfaces on at least alternate disks; actuating means operative between said housing members adapted to effect frictional braking engagement of said disks by axially compressing said disks into frictional interengagement with actuating force; automatic adjusting means to compensate for wear of said friction surfaces including an axially extending deformable member having a predetermined longitudinal crushing resistance less than said actuating force of said actuating means, said adjusting means extending longitudinally and axially between said actuating means and one of said housing members; and resilient means acting between said deformable member and one of said housing members to space all said disks axially upon deenergizing of said actuating means to disengage said brakes, whereby as said friction surfaces wear incrementally, said deformable member is progressively crushed permanently in an axial direction between said actuating means and at least one of said housing members in an amount corresponding to wear of said friction surfaces.

2. In a vehicle having a supporting frame and a rotating axle to be braked, an automatically adjusting disk brake comprising: a housing including first and second housing members secured to said frame about said axle; a plurality of axially shiftable rotor and stator disks mounted about said axle within said housing in coaxial interleaved position; friction surfaces on at least alternate disks; actuating means operative between said housing members adapted to effect frictional braking engagement of said disks by axially compressing said disks into frictional interengagement with an actuating force; spring means operable to move said actuating means with a predetermined force out of engagement with said disks to provide a running clearance therebetween; automatic adjusting means to compensate for wear of said friction surfaces including uniformly deformable means having a predetermined longitudinal crushing resistance and being positioned between said actuating means and one of said housing members to resist said spring means with a greater resistance than said spring means force, said crushing resistance being less than said actuating force of said actuating means, said deformable means being adapted to be progressively crushed permanently in an axial direction upon braking engagement of said disks in an amount corresponding to wear of said friction disks.

3. In a vehicle having a supporting frame and a rotating axle to be braked, an automatically adjusting disk brake comprising: a housing including first and second housing members secured to said frame about said axle; a plurality of axially shiftable rotor and stator disks mounted about said axle within said housing in coaxial interleaved position; friction surfaces on at least alternate disks; actuating means operative between said housing members adapted to effect frictional braking engagement of said disks by axially compressing said disks into frictional interengagement with an actuating force; spring means operable to move said actuating means with a predetermined force out of engagement with said disks to provide a running clearance between each of said rotor and stator disks; automatic adjusting means to compensate for wear of said friction surfaces including uniformly deformable means having a predetermined longitudinal crushing resistance and being operable between said actuating means and one of said housing members to resist said spring means with a greater resistance than said spring means force, said crushing resistance being less than said actuating force of said actuating means, said deformable means being adapted to be progressively crushed permanently in an axial direction upon braking engagement of said disks in an amount corresponding to wear of said friction disks; and means to limit action of said spring means in moving said actuating means in an amount progressively decreasing correspondingly to said axial crushing of said deformable means.

4. The automatically adjusting disk brake of claim 3 wherein said adjusting means has an initial length equal to the distance between said actuating means and one of said housing members when said disk brake is disengaged.

5. In a hydraulically actuatable disk brake including a housing secured in position about an associated rotatable axle to be braked, a plurality of coaxially arranged, axially shiftable stator disks and interleaved rotor disks mounted within said housing, friction material secured to alternate disks, said housing having a flat annular end plate, one of said stator disks functioning as an actuator disk spaced from said end plate with said rotor disks and said other stator disks positioned between said actuator disk and said end plate, said actuator disk being adapted for movement axially in a first direction to energize said brake and for movement axially in a second direction to deenergize said brake, actuating means to move said actuator disk with an actuating force axially in said first direction to move all of said stator and rotor disks into frictional contact with each other and with the end plate, spring means operable to move said actuator disk with a predetermined biasing force in said second direction out of frictional engagement with said associated disks to deenergize said brake and provide a running clearance between each of said stator and rotor disks and said end plate, the combination therewith of automatic adjusting means comprising: a longitudinally extending uniformly deformable member disposed between sandwiching members comprising said actuator disk and said end plate, said deformable member being adapted to be crushed in a longitudinal direction axially between said actuator disk and said end plate as said fraction material wears in braking; and means to limit axial movement of said actuator disk in said second direction to a constant amount whereby said adjusting means compensates progressively for wear of said friction linings to maintain said running clearance substantially constant.

6. A hydraulic friction disk device comprising: a stationary housing member secured in position about an associated axially extending rotatable member to be braked; a plurality of coaxially arranged axially shiftable interleaved stator and rotor disks mounted about said rotatable member said rotor disks being splined to said rotatable member for rotation therewith, alternate disks having friction material thereon, said housing member have a flat end plate facing said disks, and adapted to serve as a back up member for frictional engagement of said disks with each other and with said end plate; actuating means to move said disks with a predetermined actuating force in a first direction toward said end plate, said stator and rotor disks including an actuator disk positioned adjacent said actuating means and sandwiching the remainder of said disks between itself and said end plate, said actuator disk being movable in said first direction for energizing said brakes and in an opposite direction for deenergizing said brakes, said actuating means being operable to move said actuator disk axially in said first direction to move said disks into frictional engagement with each other and with the end plate; spring means having a predetermined biasing force and being operable to move said actuator disk in said second direction to provide a running clearance between each of said disks; automatic adjusting means to compensate for wear of said friction material including a longitudinally deformable member having a relatively uniform longitudinal crushing resistance less than said actuating force and being permanently deformable upon exposure to forces above said crushing resistance, said adjusting means being positioned in longitudinally deformable relation extending axially between said actuator disk and said end plate, said actuating means applying force through said deformable member in said first direction to crush said deformable member between said actuator disk and said end plate as said friction material wears to compensate for wear of said friction material; and stop means to limit movement of said spring means in said second direction to limit said running clearance.

7. The hydraulic friction disk device of claim 6 wherein said adjusting means comprises a honeycomb member having a plurality of longitudinally extending polygonal shaped cells, said member having a relatively greater crushing resistance than said biasing strength of said spring means and being positioned in line with said spring means whereby said spring means acting through said honeycomb member biases said actuator disk in said second direction to maintain said running clearance within a predetermined range.

8. The hydraulic friction disk device of claim 7, wherein said honeycomb member is formed of a metallic material and wherein said adjusting means includes first and second insulators secured to said honeycomb member at axially spaced first and second ends thereof positioned respectively between said first end and said actuating means and between said second end and said end plate.

9. The friction disk device of claim 7, wherein said metallic material is aluminum.

10. The disk brake of claim 5 wherein said deformable member includes: a cellular member having a plurality of longitudinally extending cells, said actuator disk having an axially extending opening therein; a stop rod secured to said housing and extending axially through said actuator disk opening, said rod being coaxially aligned with said spring means and being adapted to pass through said cellular member longitudinally, said rod having a predetermined length and being adapted to accommodate sliding movement of said actuator disk and said adjusting means axially therealong, said deformable member having a relatively higher longitudinal crushing resistance than the biasing force of said spring means, said actuating means force being greater than the crushing resistance of said adjusting means whereby as said friction linings wear upon frictional engagement of said brakes, said cellular member is crushed longitudinally between said actuator disk and said end plate to compensate for wear of said friction material.

11. For use in a hydraulically actuatable friction disk device having a stationary housing member secured in position about an associated rotatable axially extending member, said housing member presenting a flat end plate, a plurality of coaxially arranged axially shiftable friction disks including stator disks and interleaved relatively rotatable rotor disks splined to said rotatable member for rotation therewith, one of said stator and rotor disks being arranged in end-most position with respect to said other disks which are sandwiched between said end-most disk and said end plate, said end-most disk functioning as an actuator disk to shift said other stator and rotor disks axially in a first direction toward said end plate for frictional engagement with each other and with said end plate; actuating means adapted to energize said friction disk device by moving said actuator disk with a predetermined actuating force axially in said first direction; spring means adapted to move said actuator disk axially in a second direction to provide a running clearance between each of said rotor disks and stator disks and said end plate, the combination therewith of automatic adjusting means comprising: axially deformable means extending longitudinally between said actuator disk and said end plate and adapted to be axially deformably shortened between said actuator disk and said end plate in an amount corresponding to disk wear, said deformable means including a plurality of longitudinally extending cells being generally polygonal shaped in cross section and having a predetermined longitudinal crushing resistance relatively less than said actuating force said deformable means having an initial length equal to the distance between said end-most disk and said housing member; and stop means operable to limit movement of said actuator disk in said second direction to a constant amount whereby said adjusting means maintains a substantially constant running clearance between individual disks when said device is deenergized.

12. The hydraulic disk brake of claim 11 wherein said deformable means has first and second axially spaced ends and including heat insulating means secured to said first and second ends and positioned respectively between said first end and said actuator disk and between said second end and said end plate, said polygonal cells being hexagonal shaped in cross section.

13. An automatic adjusting device for a disk brake having a plurality of interleaved rotor disks and stator disks, said rotor disks having friction material on both sides thereof, a brake housing including first and second axially spaced members enclosing said disks mounted to an associated vehicle frame about a rotatable axle to be braked, said disks being axially shiftable within said housing, said rotor disks being rotatable with said axle, said stator disks being mounted to said housing against rotation therein, one of said stator disks being positioned adjacent said first housing member and functioning as an actuator disk; actuating means to move said actuating disk with actuating force axially in a first direction into position for frictional braking engagement with said other stator and rotor disks, means within said housing to bias said actuator disk in a second direction away from said other disks to obtain a running clearance between each of said disks and said second housing member, said adjusting device comprising: deformable means positioned extending longitudinally between said actuator disk and said second housing member and having a predetermined longitudinal crushing resistance less than said actuating force and being adapted to be crushed longitudinally during braking engagement of said disks between said actuator disk and said second housing member to compensate progressively for wear of said friction material, the length of said deformable means being progressively shortened and being equal initially to the distance between said actuator disk and said second housing member in said position for braking engagement; and stop means to limit movement of said actuating disk in said second direction; said actuating means moving in said second direction to a constant amount to limit said running clearance between each of said disks.

14. A self adjusting disk brake comprising: a housing having first and second abutting housing members secured in position about an associated rotatable axle to be braked, said second member presenting an annular flat inner surface facing said first member; a plurality of coaxially arranged axially shiftable stator disks and interleaved relatively rotatable axially shiftable rotor disks having friction material thereon, said rotor and stator disks being mounted within said housing, said rotor disks being splined to said axle for rotation therewith, one of said rotor and stator disks being positioned adjacent said first housing member comprising an actuator disk to shift said disks axially in a first direction toward said flat inner surface for frictional engagement therewith and with each other; means operable to energize said brake by moving said actuator disk with an actuating force axially in said first direction to bring said disks into frictional braking contact with each other and with said second member, spring means adapted to bias said actuator disk with a biasing force axially in a second direction toward said first housing member to provide an axial running clearance between said disks upon deenergizing of said brake, the combination therewith comprising: automatic adjusting means to compensate for wear of said friction material including a longitudinally deformable member secured to said actuator disk and extending axially toward said second housing member, said deformable member being adapted to be crushed between said actuating disk and said flat inner surface of said second housing member as the axial clearance between disks decreases because of wear of said friction disks, said deformable member having first and second axially spaced ends and including a plurality of longitudinally extending cells being hexagonal shaped in cross section, said cells being joined together laterally to form a unitary member having a predetermined crushing resistance; a stop rod secured to said first housing member and extending axially toward said second housing member, said rod being in line with said spring means and having a predetermined length, said rod extending longitudinally through said deformable member and being adapted to accommodate sliding movement of said actuator disk and said deformable member axially therealong, said rod having a free end positioned within said deformable member, said deformable member having a higher crushing resistance than the biasing force of said spring means, said actuating force being greater than the crushing resistance of said deformable member whereby upon wearing of said friction material of said rotor disks upon engagement of said brakes, said actuating force of said actuating means acting through said adjusting means is sufficient to crush said deformable member a predetermined amount sufficient to compensate for wear of said friction surfaces; and first and second heat insulating means secured respectively to said first and second ends of said deformable member to insulate said adjusting means thermally from said housing member and said disks, said deformable member having a predetermined length sufficient in conjunction with said first and second insulating means to prevent complete engagement of said disks upon braking except with crushing of said deformable member, said second heat insulating means being a generally flat solid member positioned between said spring means and said second end of said deformable member, said stop rod free end being axially spaced a predetermined distance from said second housing member, said free end being positioned adjacent said second heat insulating means and being adapted to encounter said second insulating means upon deenergizing of said brake to limit movement of said actuator disk in said second direction to a constant amount to maintain a substantially constant running clearance.

15. For use in a disk brake having an axially fixed member, an axially movable member and axially shiftable stator and rotor friction disks therebetween, means to move said movable member with a predetermined actuating force in a first direction a distance toward said fixed member determined partially by the amount of brake wear of said friction disks, automatic adjusting means comprising: longitudinally deformable means positioned extending axially between said axially fixed member and said axially movable member and being adapted to be longitudinally crushed therebetween as said friction disks wear, said deformable means having a uniform longitudinally crushing resistance less than said actuating force exerted through said movable member, said deformable means having an initial length sufficient to maintain said movable member a predetermined distance from said fixed member to provide a running clearance between said stator and rotor disks in a brake deenergized position, said initial length of said deformable means in a brake deenergized position being greater than the initial axial distance between said fixed member and said axially movable member in a brake energized position whereby said deformable means is axially crushed as said disks wear upon braking; spring means positioned between said deformable member and said axially fixed member to return said movable member in a second direction away from said fixed member; and means to limit movement of said axially movable member in said second direction to a constant amount while the distance of said axially movable member from said axially fixed member decreases in an amount corresponding to the amount of longitudinal crushing of said deformable member.

16. The automatic adjusting means of claim 12 wherein said deformable member crushing resistance increases substantially at a predetermined position corresponding to a predetermined amount of brake wear.

No references cited.

MILTON BUCHLER, *Primary Examiner.*

G. E. A. HALVOSA, *Assistant Examiner.*